UNITED STATES PATENT OFFICE.

FERDINAND LUEDKE, OF NEW YORK, N. Y.

IMPROVEMENT IN FACTITIOUS BEER.

Specification forming part of Letters Patent No. 30,147, dated September 25, 1860.

*To all whom it may concern:*

Be it known that I, FERDINAND LUEDKE, of New York, in the county and State of New York, have invented a new and useful Compound for Manufacturing Imitation Beer; and I hereby declare that the following is a full and exact description of the same.

This compound consists of a mixture of sugar, red wine, gum-arabic, bicarbonate of soda and powdered tartaric acid, or their equivalents, of which one tea-spoonful mixed with half a pint of water produces a very good imitation beer.

To manufacture said compound, I take one pound of powdered sugar and one pint of red wine (claret or any other red wine) and let the same boil until the mass becomes well mixed, thick, and of a dark brown-color. I then add one pint of red wine, or a little more, until the mass becomes a thin fluid. I then take one pound of sugar, and mix with the same so much of this dark fluid as above prepared until I obtain the desired color of the beer, and add then two ounces powdered gum-arabic, three and one-half ounces of bicarbonate of soda, and three (3) ounces of powdered tartaric acid, and mix the whole well in a mortar. Then allow the mixture to dry and pass through a fine sieve. When dry and sieved, I add six ounces of powdered sugar, and the compound is ready for use.

One tea-spoonful of this mixture added to half a pint of water produces a very pleasant effervescent imitation beer.

What I claim as my invention, and desire to secure by Letters Patent, is—

The combination of sugar, red wine, gum-arabic, bicarbonate of soda, and tartaric acid in the manner and in the proportions substantially as described, and for the purpose set forth.

FERDINAND LUEDKE.

Witnesses:
   HENRY E. ROEDER,
   JAMES H. DAVIDSON.